(12) United States Patent
Zhang (10) Patent No.: US 11,580,454 B2
(45) Date of Patent: Feb. 14, 2023

(54) DYNAMIC LEARNING METHOD AND SYSTEM FOR ROBOT, ROBOT AND CLOUD SERVER

(71) Applicant: CLOUDMINDS (SHENZHEN) ROBOTICS SYSTEMS CO., LTD., Guangdong (CN)

(72) Inventor: Zhanchao Zhang, Guangdong (CN)

(73) Assignee: CLOUDMINDS ROBOTICS CO., LTD., Shanghai (CN)

(*) Notice: Subject to any disclaimer, the term of this patent is extended or adjusted under 35 U.S.C. 154(b) by 472 days.

(21) Appl. No.: 16/815,840

(22) Filed: Mar. 11, 2020

(65) Prior Publication Data
US 2020/0210901 A1  Jul. 2, 2020

Related U.S. Application Data

(63) Continuation of application No. PCT/CN2017/101414, filed on Sep. 12, 2017.

(51) Int. Cl.
*G06N 20/00* (2019.01)
*G05B 19/4155* (2006.01)

(52) U.S. Cl.
CPC ......... *G06N 20/00* (2019.01); *G05B 19/4155* (2013.01); *G05B 2219/39299* (2013.01)

(58) Field of Classification Search
None
See application file for complete search history.

(56) References Cited

U.S. PATENT DOCUMENTS

| 8,380,349 B1* | 2/2013 | Hickman | H04L 67/303 |
| | | | 701/25 |
| 8,868,410 B2* | 10/2014 | Iwahashi | G10L 15/22 |
| | | | 704/10 |
| 9,792,531 B2* | 10/2017 | Georgescu | A61B 6/032 |
| 2006/0155436 A1 | 7/2006 | Matsunaga | |

(Continued)

FOREIGN PATENT DOCUMENTS

| CN | 101354587 A | 1/2009 |
| CN | 101833333 A | 9/2010 |

(Continued)

OTHER PUBLICATIONS

1st Office Action dated Jun. 15, 2021 by the JP Office; Appln.No. 2020-515011.

(Continued)

*Primary Examiner* — Charles E Anya (57) ABSTRACT

A dynamic learning method for a robot includes a training and learning mode. The training and learning mode includes the following steps: dynamically annotating a belonging and use relationship between an object and a person in a three-dimensional environment to generate an annotation library; acquiring a rule library, and establishing a new rule and a new annotation by means of an interactive demonstration behavior based on the rule library and the annotation library; and updating the new rule to the rule library and updating the new annotation to the annotation library when it is determined that the established new rule is not in conflict with rules in the rule library and the new annotation is not in conflict with annotations in the annotation library.

12 Claims, 7 Drawing Sheets

(56) References Cited

U.S. PATENT DOCUMENTS

| | | | | |
|---|---|---|---|---|
| 2009/0063388 | A1* | 3/2009 | Kim | G06N 20/00 706/50 |
| 2013/0345875 | A1* | 12/2013 | Brooks | B25J 9/0087 700/258 |
| 2015/0127149 | A1* | 5/2015 | Sinyavskiy | G05D 1/0088 700/250 |
| 2015/0217449 | A1* | 8/2015 | Meier | G05D 1/0088 901/1 |
| 2016/0154791 | A1* | 6/2016 | Cheng | G06F 40/40 704/9 |
| 2017/0206418 | A1* | 7/2017 | Schnittman | G05D 1/0274 |
| 2018/0060757 | A1* | 3/2018 | Li | G06F 3/016 |

FOREIGN PATENT DOCUMENTS

| | | |
|---|---|---|
| CN | 106101621 A | 11/2016 |
| CN | 106313079 A | 1/2017 |
| CN | 106547884 A | 3/2017 |
| JP | 2004005021 A | 1/2004 |
| JP | 2006012082 A | 1/2006 |
| JP | 2007520805 A | 7/2007 |
| JP | 2008299135 A | 12/2008 |
| JP | 2009140348 A | 6/2009 |
| JP | 2016012340 A | 1/2016 |
| JP | 2017130171 A | 7/2017 |

OTHER PUBLICATIONS

International Search Report dated Jun. 8, 2018; PCT/CN2017/101414.
1st Office Action dated Aug. 28, 2019 by the CN Office; Appln.No. 2017800033346.
Yu Jinshan et al Semantic Database Design and Semantic Map Construction of Robots Based on the Cloud, Robot, vol. 38, No. 4, Jul. 31, 2016 (Jul. 31, 2016), pp. 410-419.
Supplementary European Search Report and European search opinion dated Aug. 25, 2020; EP 17925262.2.
Roberto Capobianco: "Interactive generation and learning of semantic-driven robot behaviors", Feb. 21, 2017 (Feb. 21, 2017).
Mohan Sridharan et al: "REBA: A Refinement-Based Architecture for Knowledge Representation and Reasoning in Robotics", Journal of Artificial Intelligence Research, Apr. 19, 2017 (Apr. 19, 2017), pp. 1-53.
Argall B D et al: "A survey of robot learning from demonstration", Robotics and Autonomous Systems, Elsevier BV, Amsterdam, NL, vol. 57, No. 5, May 31, 2009 (May 31, 2009), pp. 469-483.

* cited by examiner

DYNAMIC LEARNING METHOD AND SYSTEM FOR ROBOT, ROBOT AND CLOUD SERVER

CROSS-REFERENCE TO RELATED APPLICATIONS

This application is a continuation of International Application No. PCT/CN2017/101414 with an international filing date of Sep. 12, 2017, the entire contents of which are incorporated herein by reference.

TECHNICAL FIELD

The present application relates to the technical field of robot interactions, and in particular, relates to a dynamic learning method and system for a robot, a robot and a cloud server.

BACKGROUND

With the development of network transmission and massive data technologies, and enhancement of processing capabilities of hardware, more and more robots are coming into people's life.

Functionality of the conventional robots is embodied in artificial intelligence, for example, face recognition or identification, object detection, intelligence speech interaction, text recognition and the like. For example, Baidu, Google, Sound Hound and the like research institutes have achieved a voice recognition accuracy of over 90% since the year 2015. In the voice separation and recognition contest in the year 2016, most teams in the contest have a recognition error rate lower than 7% with sixth microphones, and a giant iFLYTEK in China has almost lowered the recognition error rate to 2.24%, and achieved an accuracy approaching 99%, a man-machine interaction qualitative change threshold. In addition, in computer vision, using the ImageNet image recognition contest as an observation window, the champion team further lowered the recognition error rate to 2.99% since reduction of the error rate to a human average level in the year 2015.

The robots are becoming more and more mature in terms of audio recognition and image recognition. However, in terms of use experience of the robots, in the conventional man-machine interaction, it is general that the human asks questions and the machine answers the questions. Although the answers are given in a plurality of ways, and this process is becoming smarter and smarter, most of the robots passively receive question information from users. An in-deep artificial intelligence fails to be established between the robots and the users.

Therefore, the current robots still fail to completely perform complicated tasks designated by humans, or complete a relatively complicated interaction. For example, a user speaks to a robot "Hi, xxx, please go to the next door to take my cup and take some water with the cup for me, and I have to take medicines". In this dialog, the robot needs to understand this sentence, and conclude the following information: Where is the next room? Is there a cup in the next room?Which is the user's only cup? Where to take water? Where are the user's medicines? In addition, the robot also needs to know a series of rules to observe, for example, the water may be taken into the cup with the mouth of the cup being upwards, and all the medicines need to be found for the user and the like. As such, task planning, route planning and positioning are carried out, and move and perform a series of actions to complete the planned tasks. All of the above tasks may not performed by the conventional robot.

Chinese patent application No. 201610970633.4 has disclosed a man-machine interaction method and system for a robot. The man-machine interaction system includes: a first acquiring module, configured to acquire a laser signal; a second acquiring module, configured to acquire a voice signal; a first executing module, configured to excite different predetermined actions with respect to different laser receivers corresponding laser signal; and a second executing module, configured to perform a corresponding predetermined action and/or a corresponding predetermined voice based on the voice signal.

The robot according to the above patent application may achieve consistency of the actions and the voices of the robot. However, dynamic learning may not be carried out for a person and an environment, and in-deep artificial intelligence may not be established.

Therefore, the robot in the related art needs to be further improved.

SUMMARY

An embodiment of the present application provides a dynamic learning method for a robot. The method includes: a training and learning mode; wherein the training and learning mode comprises the following steps: dynamically annotating a belonging and use relationship between an object and a person in a three-dimensional environment to generate an annotation library; acquiring a rule library, and establishing a new rule and a new annotation by means of an interactive demonstration behavior based on the rule library and the annotation library; and updating the new rule to the rule library when it is determined that the established new rule is not in conflict with rules in the rule library.

Another embodiment of the present application provides a robot for dynamic learning. The robot includes a training and learning module, wherein the training and learning module includes a dynamic annotating module, an acquiring module, a rule updating module and a task performing module; wherein the dynamic annotating module is configured to dynamic annotate a belonging and use relationship between an object and a person in a three-dimensional environment, and store the belonging and use relationship to an annotation library; the acquiring module is configured to acquire a rule library; the rule updating module is configured to establish a new rule by means of an interactive demonstration behavior based on the rule library and the annotation library, and store the new rule to the rule library; the dynamic annotating module is further configured to establish a new annotation by means of the interactive demonstration behavior based on the rule library and the annotation library, and store the new annotation to the annotation library; and the task performing module is configured to complete a task and an interaction designated by a user based on the annotation library and the rule library.

Still another embodiment of the present application provides a cloud server. The cloud server includes a storing module, a receiving module and a determining module; wherein the storing module is configured to store annotations generated when a robot dynamic annotates a belonging and use relationship between an object and a person in a three-dimensional environment to generate an annotation library; the storing module is further configured to store a rule library of the robot; the receiving module is configured to receive a new rule established by the robot by means of an interactive demonstration behavior based on the rule library and the annotation library; the receiving module is further configured to receive a new annotation established by the robot by means of an interactive demonstration behavior based on the rule library and the annotation library; and the determining module is configured to determine whether the new rule and the rules in the rule library, and the new annotation and the annotations in the annotation library are subjected to a conflict, and update the new rule to the rule library and update the new annotation to the annotation library when no conflict is existent.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

For clearer descriptions of the objectives, technical solutions, and advantages of the present application, the present application is further described with reference to specific embodiments and attached drawings. It should be understood that the specific embodiments described herein are only intended to explain the present application instead of limiting the present application.

In a dynamic learning method and system for a robot, a robot and a cloud server according to the embodiments of the present application, the robot is set to an operating mode and a training and learning mode. In the training and learning mode, the robot is trained and learned by means of an interactive demonstration behavior, such that the robot may clearly acknowledge persons, environmental features and belonging relationships therebetween, and make a categorization to form an annotation library and a rule library. In this way, a complicated task issued by a user or a complicated interaction with a user is completed based on the annotation library and the rule library, and thus user experience is enhanced.

Figure 1:
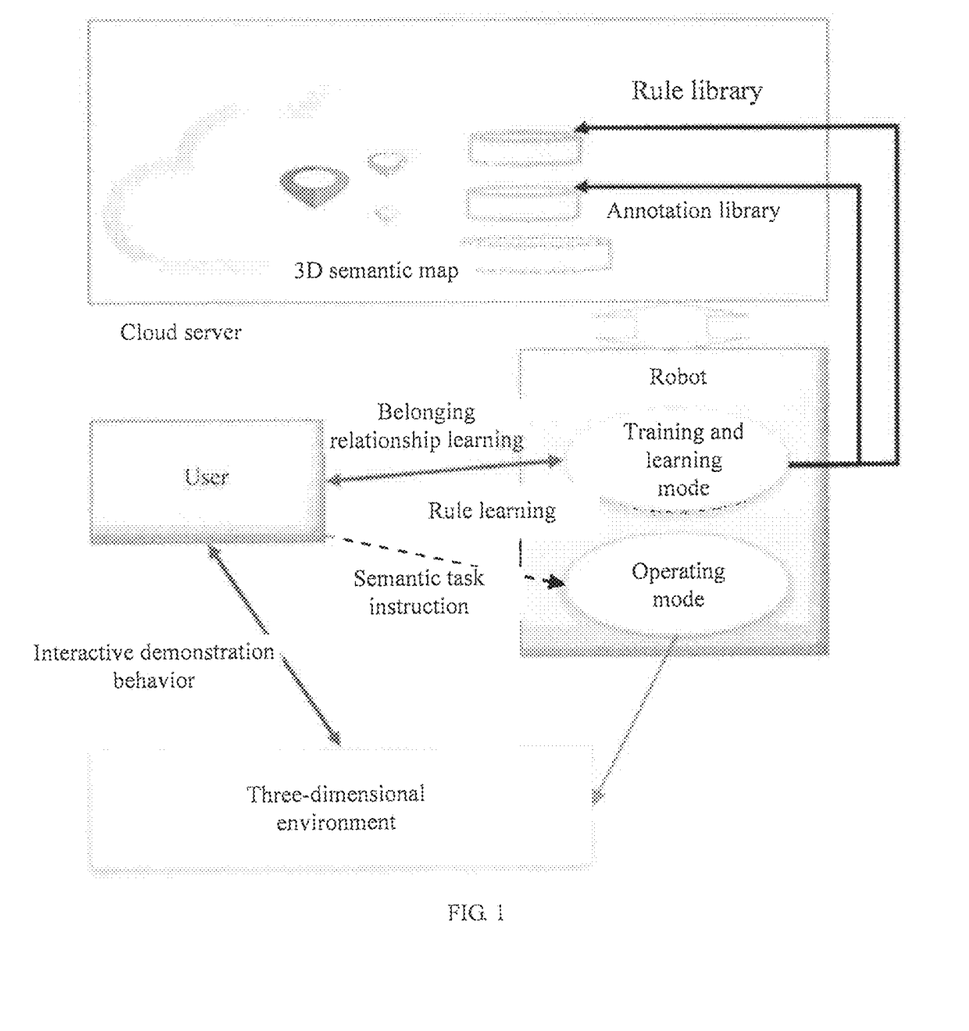
FIG. 1 is a principle diagram of a dynamic learning system for a robot according to an embodiment of the present application.

Referring to the principle diagram as illustrated in FIG. 1, in the training and learning mode, image information is acquired by using the robot, changes of a three-dimensional environment are identified, or a user carries out an interactive demonstration with the robot, such that the robot dynamically annotates a belonging relationship between a person or a object in the three-dimensional environment and dynamically learns the belonging relationship. The robot updates semantics of the dynamically annotated belonging relationship of the person or object in the three-dimensional environment or the interactive demonstration and a rule learned by means of the interactive demonstration to a database corresponding to the cloud server.

When the robots is in the operating mode, based on intelligent vision, natural language understanding and the like intelligent technologies and in combination with such feature information as space, object description and the like in an environment of the robot based on a 3D semantic map in the cloud server, the robot dynamically annotates the person or object features and learns a new behavior rule, such that the robot is capable of more intelligently carrying out a complicated task or completing a complicated interaction with human beings.

The rule library of the robot includes a default scenario rule and a learning rule. The default scenario rule refers to, in a scenario, associating a task that is defaulted or implicitly defined to be executable or non-executable with respect to the robot of this type with a customary rule in people's life. The learning rule is obtained and learned by the robot by means of an interactive demonstration behavior when the robot is in the training and learning mode.

For the sake that the annotation library and the rule library are more executable for the robot, each rule and interactive demonstrative in the rule library at least include four elements: subject, object, an action to be performed, and whether the action is allowable. The subject is a person, and the object is an environment object.

The robot acts and performs tasks in accordance with rules that are similar to rules of the human beings. In the behavior rules of the robot, a user of the robot is a subject responsible for a result of performing an action or a task, whereas the robot is only an executor of the behavior or action of the user. Each rule in the rule library of the robot further includes an element, priority differentiation. The priority of a defaulted or implicitly defined rule is generally higher than that of a rule that is learned by the robot. For example, the priority of a default scenario rule is higher than a learning rule.

Embodiment 1

Figure 2:
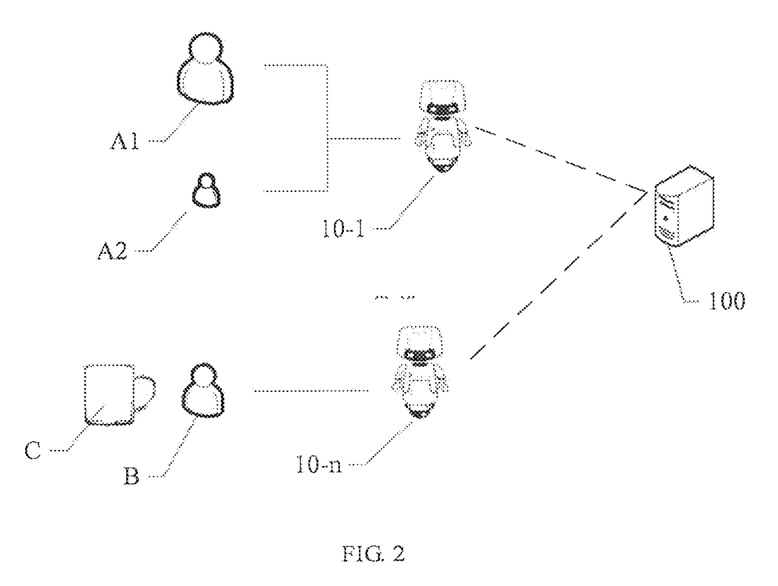
FIG. 2 is an operation relationship diagram of a dynamic learning system for a robot according to an embodiment of the present application.

Referring to FIG. 2, this embodiment provides a robot for dynamic learning. In this embodiment, a rule library and an annotation library are defined in a robot terminal. The robot for dynamic learning includes a training and learning module 20, an operating module 30, a task performing module 40, a sending module 14 and an acquiring module 12.

The training and learning module 20 includes a dynamic annotating module 22, a rule updating module 26 and an annotation updating module 24.

The dynamic annotating module 22 is configured to dynamic annotate a belonging and use relationship between an object and a person in a three-dimensional environment, and store the belonging and use relationship to an annotation library.

The dynamic annotating module 22 extracts point cloud features in the 3D environment by means of machine vision, and identifies a point cloud and a visual image to obtain an appearance attribute (including, but not limited to color, textile and the like), a geometric model (a shape of the object) and a spatial position attribute (relative front-rear, left-right and up-down positional relationships), and automatically identifies the above attributes. The belonging or use relationship between the object and the user in the three-dimensional environment is acquired based on default scenario rule learning or user interactive demonstration learning, and is then dynamically annotated.

The acquiring module 12 is configured to acquire a rule corresponding to task execution from the rule library of the robot. The rule updating module 26 is configured to establish a new rule by means of an interactive demonstration behavior based on the rule library and the annotation library, and store the new rule to the rule library.

The dynamic annotating module 22 is further configured to establish a new annotation by means of the interactive demonstration behavior based on the rule library and the annotation library, and store the new annotation to the annotation library.

The training and learning module is configured to establish a new rule and a new annotation by means of an interactive demonstration behavior based on the rule library and the annotation library. The training and learning module is further configured to update the new rule to the rule library when it is determined that the established new rule is not in conflict with rules in the rule library, and update the new annotation to the annotation library when it is determined that the new annotation is not in conflict with annotations in the annotation library.

The task performing module 40 is configured to complete a task and an interaction designated by a user based on the annotation library and the rule library.

Firstly, the belonging or use relationship between the object and the user in the three-dimensional environment is dynamically annotated by the dynamic annotating module 22 of the robot.

Referring to FIG. 2, on the basis of a 3D semantic map of the robot, the belonging or use relationship between the object and the user is annotated based on a scenario default rule. For example, the user drinks water with a cup, and a robot 10-*n* identifies that the cup is red based on a scenario of household indoor life, and automatically annotates that a red ceramic cup belongs to the user. In the meantime, information of the annotated belonging relationship is fused with information of the object in the 3D semantic map in the current environment to form an annotation indicating that a red, circular and ceramic cup C that is placed at the front-most part on a table belongs to the user.

Dynamic annotations for environment objects, for example, the cup C, or persons, for example, persons A1 and A2 may also be made by means of an interactive demonstration behavior of the user, and identified and updated therebased. The annotation based on the interactive demonstration behavior is to make an annotation synchronously while the robot is learning rules in the training and learning mode. For example, the user points to a cup and says to the robot "this is my cup". The robot identifies the cup, and automatically matches the identified cup with the red, circular and ceramic cup identified in the 3D semantic map, and dynamically annotates the cup.

A complete dynamic annotation process is as follows: A robot user triggers to enter the training and learning mode by a voice or contact-type button, and make dynamic annotations based on an appearance attribute, a geometric model attribute, a spatial position attribute and the like feature information of the object in the 3D semantic map acquired by means of machine vision and further based default scenario rule learning or user interactive demonstration learning The annotation updating module 24 observes the following operating procedures: acquiring a robot three-dimensional environment semantic map based on machine vision and natural language understanding; and acquiring a semantic map in a current scenario or the interactive demonstration behavior, identify whether the semantic map in the current scenario or the interactive demonstration behavior includes a new belonging and use relationship, parse and annotate the new belonging and use relationship, and store the new belonging and use relationship to the annotation library.

Secondly, a dynamic learning process of the robot is introduced. The rule library includes default scenario rules and learning rules, for example, rules indicating whether the robot may move a mobile entity, whether the functions of the entity may be used in the current scenario, which spatial positions in the environment may be used by the robot, which tasks may be performed by the robot owner or non-ordinary users, which tasks may be also performed by other family members of the robot owner, and which tasks may only be performed by strangers and the like.

A process of learning rules by the robot is as follows:

The user finds that the robot need to observe some rules in a specific scenario, and in this case, the user may acquire behavior rules defaulted for the user, that is, the rule library built in the robot.

The user triggers the robot to enter the training and learning mode, and by means of an interactive demonstration behavior, causes the robot to acquire features of the interactive demonstration behavior based on machine vision. The interactive demonstration behavior needs to include four elements of a behavior rule, wherein whether the behavior is allowed or accepted or the like needs to be indicated.

For example, the robot may prompt the user to perform subject annotation learning when finding that the demonstration behavior has no corresponding subject belonging. If the four elements of the behavior rule are all satisfied, and there is no conflict with the default rules of the robot, the user is informed that a new rule is successfully established.

When the robot judges that the new rule is in conflict with the default rules, the user is prompted to form a rule that is not in conflict with the default rules by means of an interactive demonstration behavior again, or allow a user having a higher privilege to modify the default rules.

Figure 3:
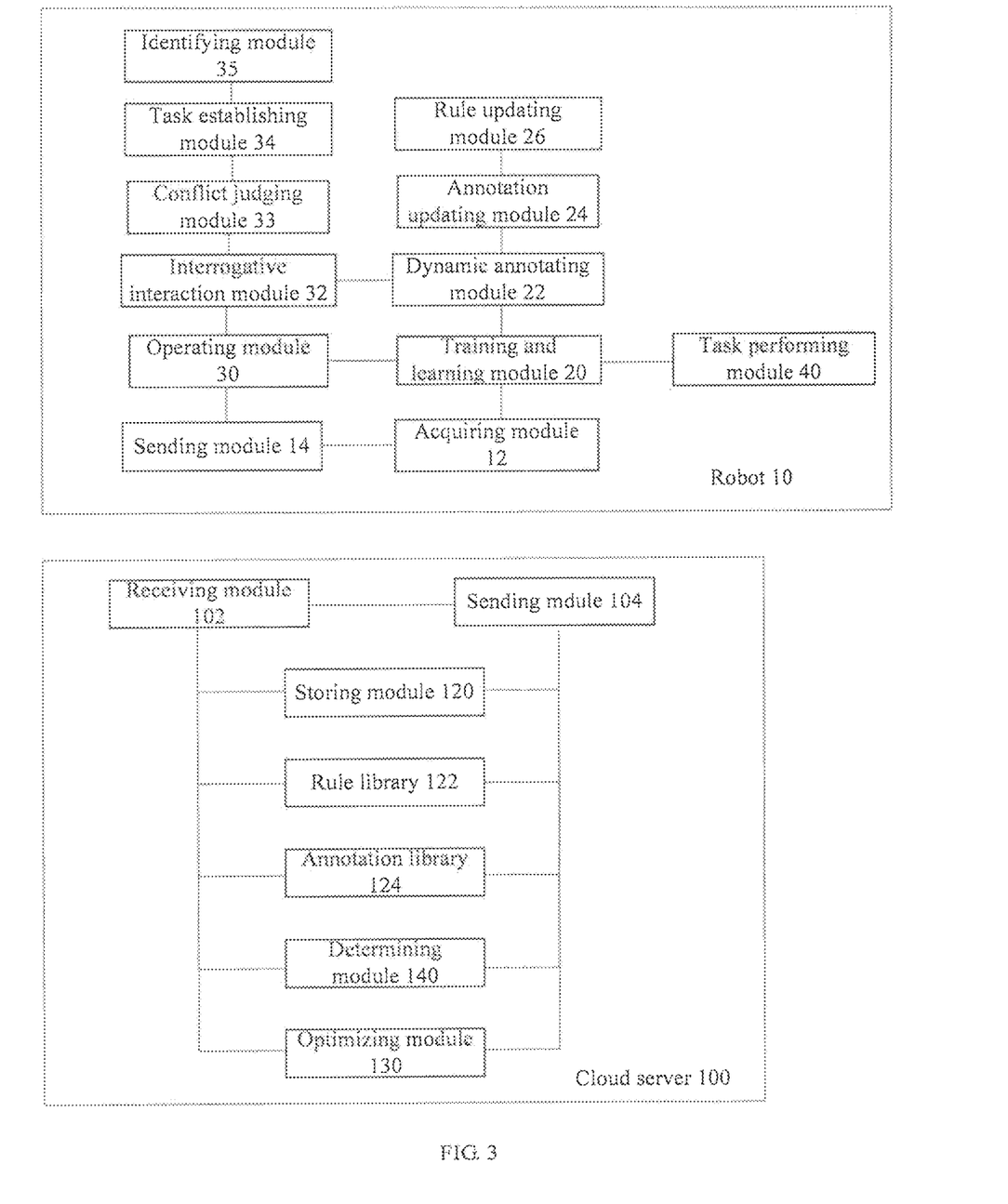
FIG. 3 is a diagram of modules a dynamic learning system for a robot according to an embodiment of the present application.

Further referring to FIG. 3, the operating module includes an identifying module 35, a task establishing module 34, a conflict judging module 33 and an interrogative interaction module 32.

The identifying module 35 is configured to receive an audio instruction from the user, and identify the audio instruction. The task establishing module 34 is configured to carry out task planning based on the identified audio instruction and the rule library. The conflict judging module 33 is configured to judge whether the task planning is in conflict with a rule. The interrogative interaction module 32 is configured to establish an interrogative interaction with the user when the task planning is in conflict with a rule.

When the robot operates, an audio instruction from the user is received and analyzed for understanding. When task planning may not be performed, the robot may repeatedly carry out interrogative dialogues with the user until the robot acquires and correctly understands task instruction information, or task planning may be explicitly performed when known information arrives.

The robot may judge and secondarily optimize a local task and a global task based on the rule library of the robot. Where a rule conflict occurs, the robot sends a prompt to the user, and depicts the scenario and occasion using a natural language. With respect to the operations on the database, the following suggestions may be given: suggestion 1: continue the task and accept the result; suggestion 2: cancel this task; suggestion 3: enter the training and learning mode, and revise and update the rules. If a conflict with a strictly prohibited rule occurs, the canceled task is performed, and the user is informed.

Based on interaction feedback from the user, if suggestion 1 is selected, the robot continues to perform the task, and ignores the behavior rule in conflict with the task; if suggestion 2 is selected, this task is canceled, and the robot is still in the operating mode and in a standby state; and if suggestion 3 is selected, the robot enters the above training and learning mode.

The robot observes a priority model of the behavior rules when performing human instructed tasks.

Embodiment 2

Referring to FIG. 3, this embodiment provides a cloud server. In this embodiment, a rule library and an annotation library are arranged on a cloud server to reduce data processing amount for the robot, and establish a uniform artificial intelligence processing framework.

The cloud server includes a receiving module 102, a sending module 104, a storing module 120, a rule library 122, an annotation library 124, a determining module 140 and an optimizing module 130.

The storing module 120 is configured to store annotations generated when a robot dynamic annotates a belonging and use relationship between an object and a person in a three-dimensional environment to generate the annotation library 124. The storing module 122 is further configured to store a rule library of the robot.

The receiving module 102 is configured to receive a new rule established by the robot by means of an interactive demonstration behavior based on the rule library and the annotation library. The receiving module 102 is further configured to receive a new annotation established by the robot by means of an interactive demonstration behavior based on the rule library and the annotation library. The determining module 140 is configured to determine whether the new rule and the rules in the rule library, and the new annotation and the annotations in the annotation library are subjected to a conflict, and update the new rule to the rule library and update the new annotation to the annotation library when no conflict is existent.

The sending module 104 is configured to send a corresponding annotation and rule based on a request from the robot; and the optimizing module 130 is configured to receive task planning from the robot, and optimize the task planning based on the annotation library and the rule library.

Still referring to FIG. 2, in this embodiment, the robot carries out face-to-face interactions with the user and completes the delivered task based on machine vision and natural language understanding. Formation, update and analysis of the database are arranged on the cloud server.

In the meantime, the cloud server judges and secondarily optimizes the local task and the global task for the robot based on the rule library and the annotation library. Where a rule conflict occurs, the robot sends a prompt to the user, depicts the scenario and occasion using a natural language, and gives possible suggestions, for example, suggestion 1: continue the task and receive the result; suggestion 2: cancel the task; and suggestion 3: enter the training and learning mode, reverse and update the rules. If a conflict with a strictly prohibited rule occurs, the canceled task is performed, and the user is informed.

Embodiment 3

Referring to FIG. 2, this embodiment provides a dynamic learning system for a robot. The dynamic learning system may be independently arranged on the robot. Specific details may be referenced to Embodiment 1. The dynamic learning method may also be arranged between a robot 10 and a cloud server 100. The cloud server 100 establishes and updates an annotation library and a rule library. Specific details may be referenced to Embodiment 2.

Generally, the dynamic learning system for a robot mainly includes a training and learning module, an operating module, a task performing module and an interrogative interaction module.

The training and learning module is configured to perform the following steps: dynamically annotating a belonging and use relationship between an object and a person in a three-dimensional environment to generate an annotation library; acquiring a rule library, and establishing a new rule and a new annotation by means of an interactive demonstration behavior based on the rule library and the annotation library; and updating the new rule to the rule library and updating the new annotation to the annotation library when it is determined that the established new rule is not in conflict with rules in the rule library and the new annotation is not in conflict with annotations in the annotation library.

An example of dynamically annotating the belonging and use relationship between the object and the person in the three-dimensional environment includes: extracting point cloud features in the 3D environment by means of machine vision, and identifying a point cloud and a visual image to obtain an appearance attribute (including, but not limited to color, textile and the like), a geometric model attribute (a shape of the object) and a spatial position attribute (relative front-rear, left-right and up-down positional relationships) of the object, and automatically identifying the above attributes. The belonging or use relationship between the object and the user in the three-dimensional environment is acquired based on default scenario rule learning or user interactive demonstration learning, and is then dynamically annotated.

The task performing module is configured to complete a task and an interaction designated by a user based on the annotation library and the rule library.

The training and learning module further includes an annotation updating module; wherein the annotation updating module is configured to:

call a robot three-dimensional environment semantic map based on machine vision and natural language understanding;

acquire a semantic map in a current scenario or the interactive demonstration behavior, identify whether the semantic map in the current scenario or the interactive demonstration behavior includes a new belonging and use relationship, parse and annotate the new belonging and use relationship, and store the new belonging and use relationship to the annotation library.

In addition, the system further includes an operating module; wherein the operating module is configured to perform the following steps: receiving an audio instruction from the user, and identifying the audio instruction; carrying out task planning based on the identified audio instruction and the rule library; and judging whether the task planning is in conflict with a rule, and establishing an interrogative interaction with the user if the task planning is in conflict with a rule.

The interrogative interaction module includes the following interrogative interaction content: an interrogative interaction for continuously carrying out the task planning, wherein the conflicted rule is ignored when the user selects to continuously carrying out the task planning; an interrogative interaction canceled, wherein an operating mode is switched when the user selects to cancel the task planning, and an interrogative interaction for entering the training and learning mode.

The robot observes a priority model of the behavior rules when performing user instructed tasks.

Embodiment 4

This embodiment provides a dynamic learning method for a robot. The method includes a training and learning mode and an operating mode.

Figure 4:
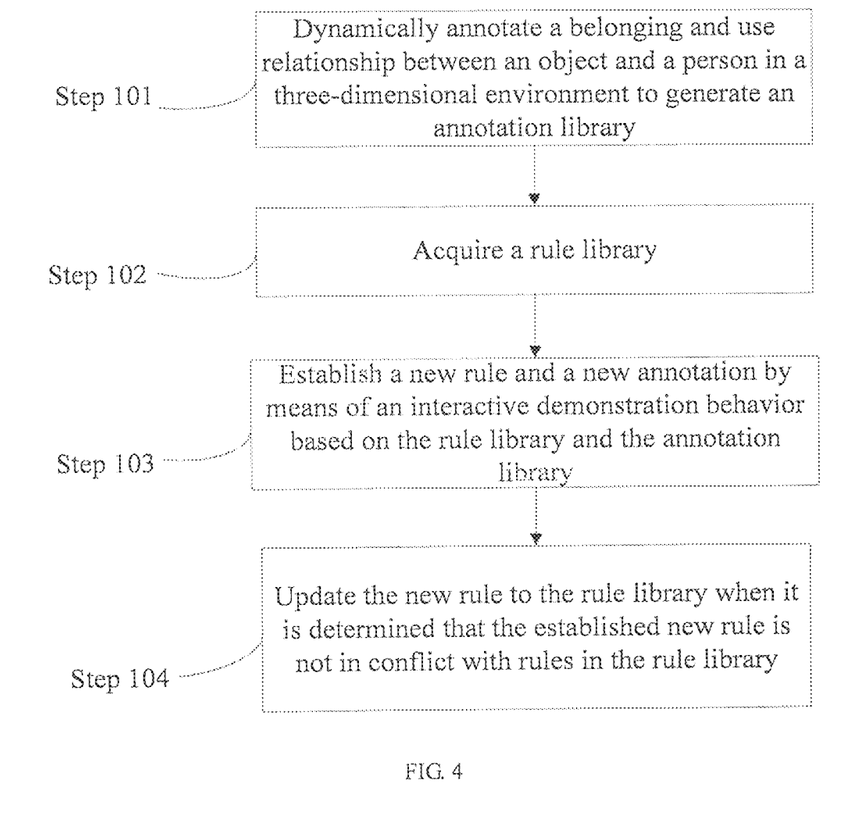
FIG. 4 is a main flowchart of a dynamic learning method for a robot in a training and learning mode according to an embodiment of the present application.

Referring to FIG. 4, the training and learning mode includes the following steps:

step 101: dynamically annotating a belonging and use relationship between an object and a person in a three-dimensional environment to generate an annotation library;

step 102: acquiring a rule library;

step 103: establishing a new rule and a new annotation by means of an interactive demonstration behavior based on the rule library and the annotation library; and step 104: updating the new rule to the rule library when it is determined that the established new rule is not in conflict with rules in the rule library.

The training and learning mode further includes acknowledgement of the new annotation:

updating the new annotation to the annotation library when it is determined that the new annotation is not in conflict with annotations in the annotation library; and in the operating mode, completing a task and an interaction designated by a user by the robot based on the annotation library and the rule library.

Figure 5:
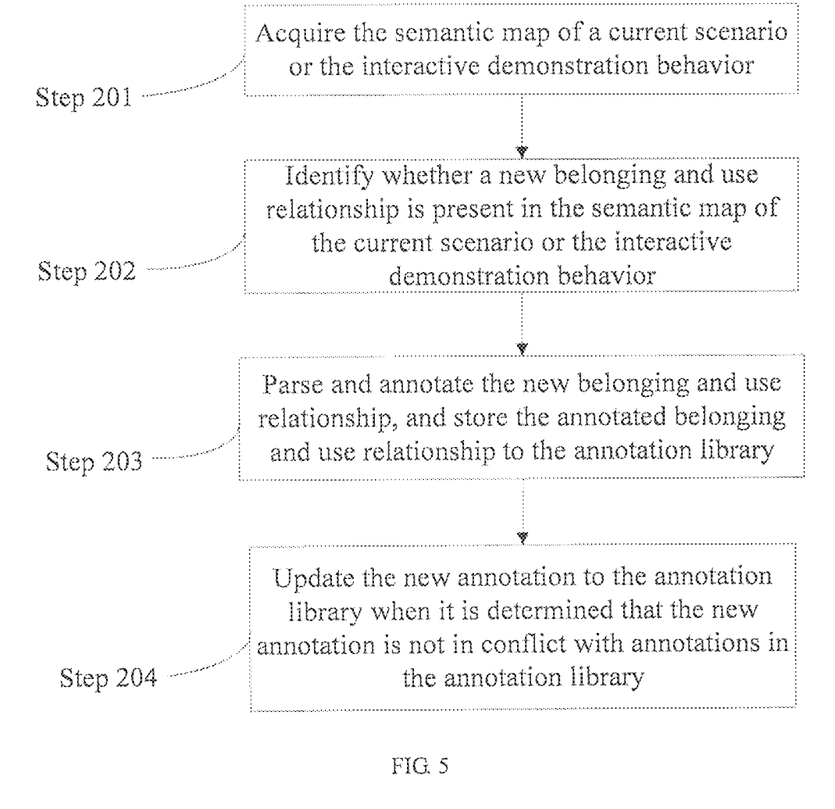
FIG. 5 is a flowchart of annotation update in a dynamic learning system for a robot according to an embodiment of the present application.

Referring to FIG. 5, the step of dynamically annotating the belonging and use relationship between the object and the person in the three-dimensional environment is performed based on machine vision and natural language understanding and the called 3D semantic map of the robot (which is also referred to as a three-dimensional environment semantic map).

The annotation update and acknowledgement process includes the following steps:

step 201: acquiring the semantic map of a current scenario or the interactive demonstration behavior;

step 202: identifying whether a new belonging and use relationship is present in the semantic map of the current scenario or the interactive demonstration behavior;

step 203: parsing and annotating the new belonging and use relationship, and storing the annotated belonging and use relationship to the annotation library; and step 204: updating the new annotation to the annotation library when it is determined that the new annotation is not in conflict with annotations in the annotation library.

Figure 6:
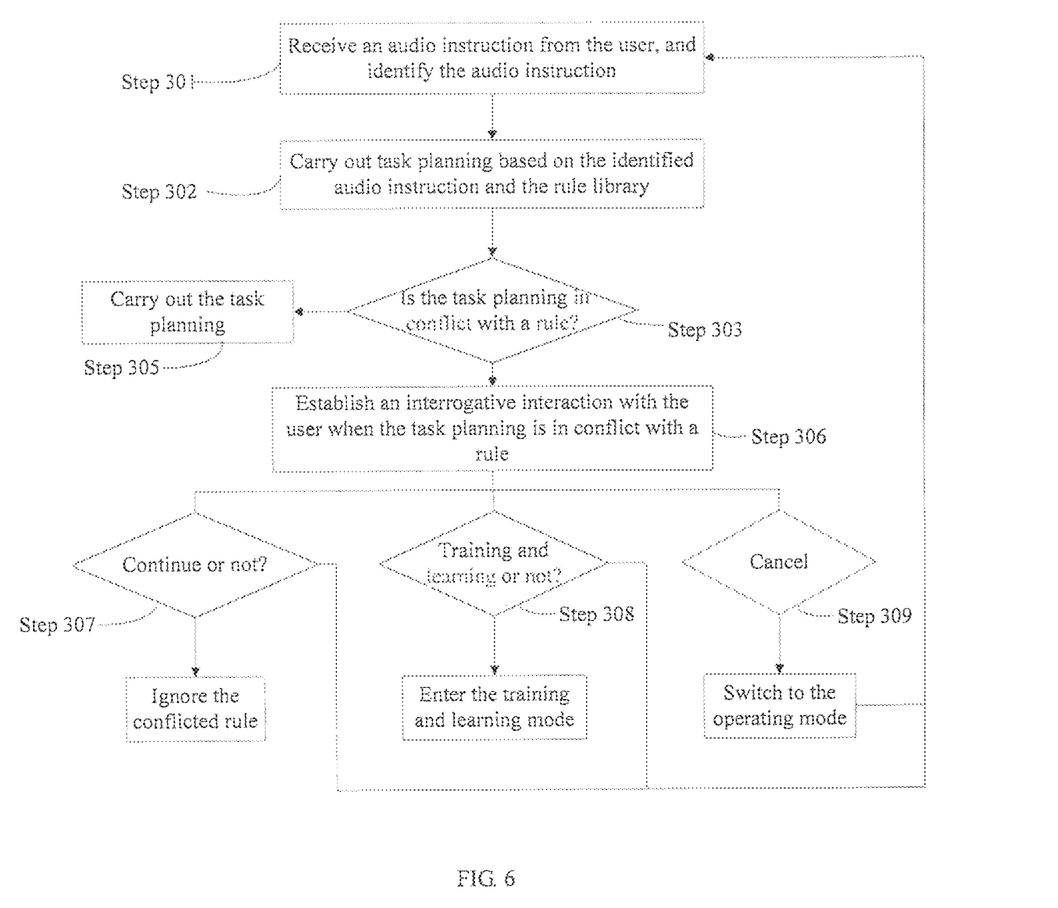
FIG. 6 is a flowchart of a dynamic learning system for a robot in an operating mode according to an embodiment of the present application.

Referring to FIG. 6, a flowchart of the robot in an operating mode is illustrated. The operating mode includes the following steps:

step 301: receiving an audio instruction from the user, and identify the audio instruction;

step 302: carrying out task planning based on the identified audio instruction and the rule library;

step 303: judging whether the task planning is in conflict with a rule;

step 305: carrying out the task planning when the task planning is not in conflict with a rule; and step 306: establishing an interrogative interaction with the user when the task planning is in conflict with a rule.

The interrogative interaction process includes the following steps:

step 307: initiating an interrogation for determining whether to continuously carry out the task planning, wherein the robot initiates an interrogative interaction for continuously carrying out the task planning, and the conflicted rule is ignored when the user selects to continuously performing the task planning;

step 308: initiating an interrogation for determining whether to cancel the task planning, wherein the robot initiates an interrogative interaction for canceling the task planning, and the robot switches to an operating mode when the user selects to cancel the task planning; and step 309: initiating an interrogation for determining whether to carrying out training and learning, wherein the robot initiates an interrogative interaction for switch between the training and learning mode and the operating mode, and the robots switches to the training and learning mode when the user selects to enter the training and learning mode.

In the dynamic learning method and system for a robot, the robot for dynamic learning and the cloud server thereof according to the present application, a training and learning mode is defined; training and learning are carried out for the robot by means of an interactive demonstrative behavior; and an annotation library and a rule library are established and constantly updated based on image vision and robot semantic understanding, such that the robot may clearly acknowledge persons, environmental features and belonging relationships therebetween and constantly update changes of the persons and the environment. In this way, a complicated task issued by a user or a complicated interaction with a user is completed based on the annotation library and the rule library, and thus user experience is enhanced.

Embodiment 5

Figure 7:
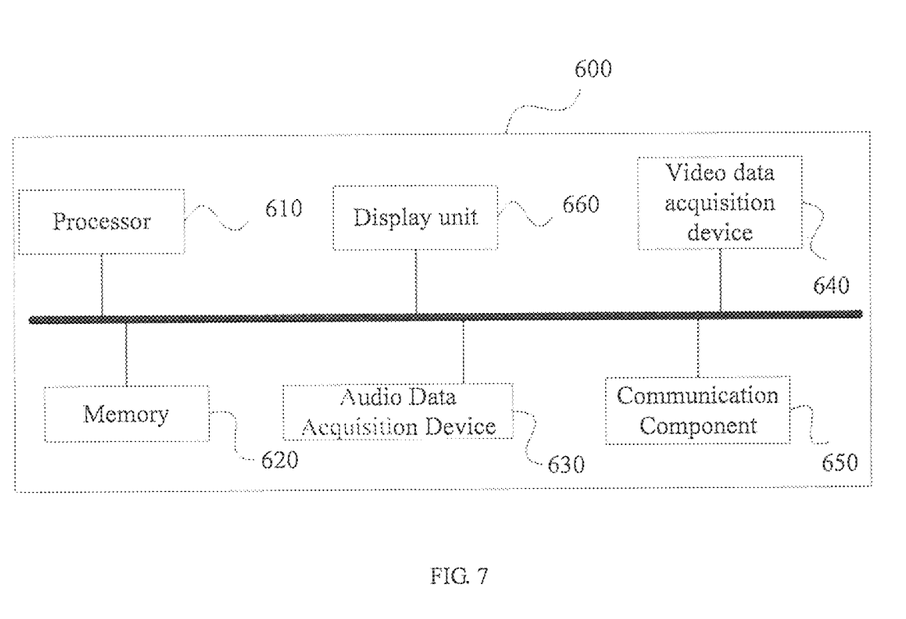
FIG. 7 is a schematic structural diagram illustrating hardware of an electronic device for performing the dynamic learning method for a robot according to an embodiment of the present application.

FIG. 7 is a schematic structural diagram illustrating hardware of an electronic device 600 for performing the dynamic learning method for a robot according to an embodiment of the present application.

As illustrated in FIG. 7, the electronic device 600 includes: at least one processor 610, a memory 620, an audio data acquisition device 630, a video data acquisition device 640, a communication component 650 and a display unit 660. FIG. 7 uses one processor 610 as an example. Outputs of the audio data acquisition device are inputs of an audio identifying module, and outputs of the video data acquisition device are inputs of a video identifying module. The memory 620 stores instructions executable by the at least one processor 610, wherein, the instructions, when being executed by the at least one processor, call data of the audio data acquisition device and the video data acquisition device, and establish a connection to a cloud server by using the communication component 650, such that the at least one processor performs the dynamic learning method for a robot as described above.

The at least one processor 610, the memory 620, the display unit 660 and the audio data acquisition device 630 may be connected via a bus or in another manner, and FIG. 7 uses the bus as an example.

The memory 620, as a non-volatile computer-readable storage medium, may be configured to store non-volatile software programs, non-volatile computer-executable programs and modules, for example, the program instructions/modules (for example, the training and learning module 20, the operating module 30, the dynamic annotating module, an annotation updating module 24, a rule updating module 26, an interrogative interaction module 32, a determining module 140 and an optimizing module 130 as illustrated in FIG. 3) corresponding to the dynamic learning method for a robot according to the embodiments of the present application. The non-volatile software programs, instructions and modules stored in the memory 620, when being executed, cause the at least one processor 610 to perform various function applications and data processing of a server, that is, performing the dynamic learning method for a robot in the above method embodiments.

The memory 620 may include a program memory area and data memory area, wherein the program memory area may store operation systems and application programs needed by at least one function; and the data memory area may store data created according to the use of the robot. In addition, the memory 620 may include a high speed random access memory, or include a non-volatile memory, for example, at least one disk storage device, a flash memory device, or another non-volatile solid storage device. In some embodiments, the memory 620 optionally includes the memory remotely arranged relative to the processor 610, and such remote memory may be connected to the electronic device over the network. Examples of the above network include, but not limited to, the Internet, Intranet, local area network, mobile communication network and a combination thereof.

One or a plurality of modules are stored in the memory 620, and when being executed by the at least one processor 610, perform the dynamic learning method for a robot according to any of the above method embodiments, for example, performing steps 101 to 104 in the method as illustrated in FIG. 2, steps 201 to 204 in the method as illustrated in FIG. 4, and steps 301 to 309 in the method as illustrated in FIG. 5; or implementing the functions of the training and learning module 20, the operating module 30, the dynamic annotating module 22, the annotation updating module 24, the rule updating module 26, the interrogative interaction module 32, the determining module 140, the optimizing module 130 and the like as illustrated in FIG. 3.

The product may perform the method according to the embodiments of the present application, has corresponding function modules for performing the method, and achieves the corresponding beneficial effects. For technical details that are not illustrated in detail in this embodiment, reference may be made to the description of the methods according to the embodiments of the present application.

An embodiment of the present application further provides a non-volatile computer-readable storage medium. The computer-readable storage medium stores computer-executable instructions, which, when being executed by at least one processor, may cause the at least one processor to perform steps 101 to 104 in the method as illustrated in FIG. 2, steps 201 to 204 in the method as illustrated in FIG. 4, and steps 301 to 309 in the method as illustrated in FIG. 5; and implementing the functions of the training and learning module 20, the operating module 30, the dynamic annotating module 22, the annotation updating module 24, the rule updating module 26, the interrogative interaction module 32, the determining module 140, the optimizing module 130 and the like as illustrated in FIG. 3.

The above described apparatus embodiments are merely for illustration purpose only. The units which are described as separate components may be physically separated or may be not physically separated, and the components which are illustrated as units may be or may not be physical units, that is, the components may be located in the same position or may be distributed into a plurality of network units. A part or all of the modules may be selected according to the actual needs to achieve the objectives of the technical solutions of the embodiments.

According to the above embodiments of the present application, a person skilled in the art may clearly understand that the embodiments of the present application may be implemented by means of hardware or by means of software plus a necessary general hardware platform. Persons of ordinary skill in the art may understand that all or part of the steps of the methods in the embodiments may be implemented by a program instructing relevant hardware. The program may be stored in a computer-readable storage medium and may be executed by at least one processor. When the program runs, the steps of the methods in the embodiments are performed. The storage medium may be any medium capable of storing program codes, such as read-only memory (ROM), a random access memory (RAM), a magnetic disk, or a compact disc-read only memory (CD-ROM).

Finally, it should be noted that the above embodiments are merely used to illustrate the technical solutions of the present application rather than limiting the technical solutions of the present application. Under the concept of the present application, the technical features of the above embodiments or other different embodiments may be combined, the steps therein may be performed in any sequence, and various variations may be derived in different aspects of the present application, which are not detailed herein for brevity of description. Although the present application is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present application.

What is claimed is:

1. A dynamic learning method for a robot, comprising a training and learning mode; wherein the training and learning mode comprises the following steps:
   dynamically annotating a belonging and use relationship between an object and a person in a three-dimensional environment to generate an annotation library;
   acquiring a rule library, and establishing a new rule and a new annotation by means of an interactive demonstration behavior based on the rule library and the annotation library; and
   updating the new rule to the rule library when it is determined that the established new rule is not in conflict with rules in the rule library;
   the dynamic learning method for a robot further comprising a working mode; wherein the working mode comprises the following steps:
   receiving an audio instruction from a user, and identifying the audio instruction;

carrying out task planning based on the identified audio instruction and the rule library; and judging whether the task planning is in conflict with a rule, and establishing an interrogative interaction with the user if the task planning is in conflict with a rule; the interrogative interaction comprises:

an interrogative interaction for continuously carrying out the task planning, wherein the conflicted rule is ignored when the user selects to continuously carry out the interrogative interaction;

an interrogative interaction for canceling the task planning, wherein the operating mode is switched when the user selects to cancel the interrogative interaction; and an interrogative interaction for entering the training and learning mode.

2. The method according to claim 1, further comprising:
updating the new annotation to the annotation library when it is determined that the new annotation is not in conflict with annotations in the annotation library; and
completing a task and an interaction designated by a user based on the annotation library and the rule library.

3. The method according to claim 1, wherein the step of dynamically annotating the belonging and use relationship between the object and the person in the three-dimensional environment comprises:
calling a robot three-dimensional environment semantic map based on machine vision and natural language understanding; and
acquiring a semantic map in a current scenario or the interactive demonstration behavior, identifying whether the semantic map in the current scenario or the interactive demonstration behavior comprises a new belonging and use relationship, parsing and annotating the new belonging and use relationship, and storing the new belonging and use relationship to the annotation library.

4. The method according to claim 3, wherein each rule and interactive demonstration behavior in the rule library comprise four elements: subject, object, action to be performed and whether the action is allowed; and the rule library comprises a default scenario rule and a learning rule.

5. An electronic device, comprising at least one processor; and a memory communicably connected to the at least one processor: wherein
the memory stores instructions executable by the at least one processor, wherein, the instructions, when being executed by the at least one processor, cause the at least one processor to perform the steps of:
the electronic device further training and learning mode: wherein the training and learning mode comprises the following steps:
dynamically annotating a belonging and use relationship between an object and a person in a three-dimensional environment to generate an annotation library;
acquiring a rule library, and establishing new rule and a new annotation by means of an interactive demonstration behavior based on the rule library and the annotation library; and
updating the new rule to the rule library when it is determined that the established new rule is not in conflict with rules in the rule library;
the electronic device further comprising a working mode: wherein the working mode comprises the following steps:
receiving an audio instruction from a user, and identifying the audio instruction;

carrying out task planning based on the identified audio instruction and the rule library; and judging whether the task planning is in conflict with a rule, and establishing an interrogative interaction with the user if the task planning is in conflict with a rule; the interrogative interaction comprises:

an interrogative interaction for continuously carrying out the task planning, wherein the conflicted rule is ignored when the user selects to continuously carry out the interrogative interaction;

an interrogative interaction for canceling the task planning, wherein the operating mode is switched when the user elects to cancel the interrogative interaction; and an interrogative interaction for entering the training and learning mode.

6. The electronic device according to claim 5, wherein, the instructions, when being executed by the at least one processor, cause the at least one processor to further perform the steps of:
updating the new annotation to the annotation library when it is determined that the new annotation is not in conflict with annotations in the annotation library; and
completing a task and an interaction designated by a user based on the annotation library and the rule library.

7. The electronic device according to claim 5, wherein the step of dynamically annotating the belonging and use relationship between the object and the person in the three dimensional environment comprises:
calling a robot three-dimensional environment semantic map based on machine vision and natural language understanding; and
acquiring a semantic map in a current scenario or the interactive demonstration behavior, identifying whether the semantic map in the current scenario or the interactive demonstration behavior comprises a new belonging and use relationship, parsing and annotating the new belonging and use relationship, and storing the new belonging and use relationship to the annotation library.

8. The electronic device according to claim 7, wherein each rule and interactive demonstration behavior in the rule library comprise four elements: subject, object, action to be performed and whether the action is allowed; and the rule library comprises a default scenario rule and a learning rule.

9. A non-transitory computer-readable storage medium, wherein the computer readable storage medium stores computer executable instructions, which, when being executed by at least one processor, may cause the at least one processor to perform the steps of:
the electronic device further training and learning mode: wherein the training and learning mode comprises the following steps:
dynamically annotating a belonging and use relationship between an object and a person in a three-dimensional environment to generate an annotation library;
acquiring a rule library, and establishing a new rule and a new annotation by means of an interactive demonstration behavior based on the rule library and the annotation library; and
updating the new rule to the rule library when it is determined that the established new rule is not in conflict with rules in the rule library;
the electronic device further comprising a working mode; wherein the working mode comprises the following steps:
receiving an audio instruction from a user, and identifying the audio instruction;

carrying out task planning based on the identified audio instruction and the rule library; and judging whether the task planning is in conflict with a rule, and establishing an interrogative interaction with the user if the task planning is in conflict with a rule; the interrogative interaction comprises:

an interrogative interaction for continuously carrying out the task planning, wherein the conflicted rule is ignored when the user selects to continuously carry out the interrogative interaction;

an interrogative interaction for canceling the task planning, wherein the operating mode is switched when the user selects to cancel the interrogative interaction; and an interrogative interaction for entering the training and learning mode.

10. The non-transitory computer-readable storage medium according to claim 9, wherein the computer executable instructions, when being executed by the at least one processor, further causes the at least one processor to perform the steps of:

updating the new annotation to the annotation library when it is determined that the new annotation is not in conflict with annotations in the annotation library; and completing a task and an interaction designated by a user based on the annotation library and the rule library.

11. The non-transitory computer-readable storage medium according to claim 9, wherein the step of dynamically annotating the belonging and use relationship between the object and the person in the three-dimensional environment comprises:

calling a robot three-dimensional environment semantic map based on machine vision and natural language and understanding; and acquiring a semantic map in a current scenario or the interactive demonstration behavior, identifying whether the semantic map in the current scenario or the interactive demonstration behavior comprises a new belonging and use relationship, parsing and annotating the new belonging and use relationship, and storing the new belonging and use relationship to the annotation library.

12. The non-transitory computer-readable storage medium according to claim 11, wherein each rule and interactive demonstration behavior in the rule library comprise four elements: subject, object, action to be performed and whether the action is allowed; and the rule library comprises a default scenario rule and a learning rule.

* * * * *